US007885487B2

(12) United States Patent
Ku (10) Patent No.: US 7,885,487 B2
(45) Date of Patent: Feb. 8, 2011

(54) METHOD AND APPARATUS FOR EFFICIENTLY ENLARGING IMAGE BY USING EDGE SIGNAL COMPONENT

(75) Inventor: Jeong-Hoe Ku, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1034 days.

(21) Appl. No.: 11/704,179

(22) Filed: Feb. 8, 2007

(65) Prior Publication Data

US 2007/0230812 A1  Oct. 4, 2007

(30) Foreign Application Priority Data

Feb. 8, 2006  (KR) ............... 10-2006-0012149

(51) Int. Cl.
*G06K 9/32* (2006.01)
*G06K 9/36* (2006.01)
*G06K 9/40* (2006.01)
*H04N 7/01* (2006.01)
*H04N 1/46* (2006.01)

(52) U.S. Cl. .............. 382/300; 382/237; 382/250; 382/263; 382/264; 348/441; 358/525

(58) Field of Classification Search .............. 382/300
See application file for complete search history.

(56) References Cited

U.S. PATENT DOCUMENTS 5,774,601 A * 6/1998 Mahmoodi ............... 382/298
6,263,120 B1 * 7/2001 Matsuoka ................. 382/300
6,650,790 B1 * 11/2003 Arbeiter et al. ............ 382/275
7,315,661 B2 * 1/2008 Lee ......................... 382/300
7,355,757 B2 * 4/2008 Bhattacharjya ........... 358/3.27
7,447,383 B2 * 11/2008 Lee ......................... 382/300

FOREIGN PATENT DOCUMENTS

| JP | 05-328106 | 12/1993 |
| JP | 10-336433 | 12/1998 |
| JP | 2005-326977 | 11/2005 |
| KR | 1997-0078571 | 12/1997 |

\* cited by examiner

*Primary Examiner*—Bhavesh M Mehta
*Assistant Examiner*—Jose M Torres
(74) *Attorney, Agent, or Firm*—The Farrell Law Firm, LLP (57) ABSTRACT

A method and an apparatus for efficiently enlarging an image, where the outermost Discrete Cosine Transform (DCT) components from a DC value are regarded as high frequency components in DCT components expressed in one two-dimensional coordinate system, the edge signals of an image are restored by means of only the high frequency components, and then a binary edge mask, which represents the distribution of high frequency components within the image, is generated from the restored edge signals. Accordingly, an interpolation order can be determined based on the binary edge mask and interpolation can be performed. A higher order low pass filter is applied to an area having many high frequency signal components, so that it is possible to output more precisely enlarged image signals. In this way, that it is possible to improve the overall picture quality of an enlarged image, and to properly adjust the amount of calculation and buffer capacity, which are used when interpolation is performed.

6 Claims, 6 Drawing Sheets

IMAGE IS ENLARGED IN RATIO OF 1:4

FIG.3

| d(0,0) | d(0,1) | d(0,2) | d(0,3) | | | | |
|--------|--------|--------|--------|--|--|--|--|
| d(1,0) | d(1,1) | d(1,2) |        | | | | |
| d(2,0) | d(2,1) |        |        | | | | |
| d(3,0) |        |        |        | | | | |

FIG. 4

| 15 | 14 | 9  | 8  | 3  | 1  | 2  | 1  |
|----|----|----|----|----|----|----|----|
| 15 | 16 | 13 | 10 | 1  | 6  | 7  | 2  |
| 10 | 14 | 15 | 14 | 8  | 2  | 3  | 1  |
| 1  | 9  | 16 | 17 | 15 | 9  | 5  | 7  |
| 2  | 5  | 10 | 18 | 19 | 14 | 6  | 3  |
| 3  | 3  | 5  | 9  | 14 | 18 | 15 | 4  |
| 2  | 2  | 6  | 7  | 8  | 16 | 21 | 21 |
| 3  | 4  | 5  | 7  | 8  | 10 | 15 | 23 |

FIG.5

| | | | | | | | |
|---|---|---|---|---|---|---|---|
| 0 | 0 | 0 | 0 | 0 | 1 | 1 | 1 |
| 0 | 0 | 0 | 0 | 0 | 1 | 1 | 1 |
| 0 | 0 | 0 | 0 | 1 | 1 | 1 | 0 |
| 0 | 0 | 1 | 1 | 1 | 1 | 0 | 0 |
| 0 | 0 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 0 | 0 | 0 | 0 | 0 | 0 |

METHOD AND APPARATUS FOR EFFICIENTLY ENLARGING IMAGE BY USING EDGE SIGNAL COMPONENT

PRIORITY

This application claims priority to an application filed in the Korean Intellectual Property Office on Feb. 8, 2006 and assigned Serial No. 2006-12149, the contents of which are incorporated herein by reference.

BACKGROUND OF THE INVENTION

1. Field of the Invention

The present invention generally relates to a method and an apparatus for enlarging an image, and more particularly to a method and an apparatus for efficiently enlarging an image by using edge signal components while ensuring picture quality in a high frequency area.

2. Description of the Related Art

Nowadays, a terminal capable of reproducing a multimedia image including a Digital Multimedia Broadcasting (DMB) has been generalized. When an image is transmitted according to such a trend, the corresponding image contains a huge amount of data because graphs or texts have been mixed with a natural image. Therefore, it is necessary to perform various image processing operations for complicated images. Among these image processing operations, when a user wants to view an image, which is being displayed through a terminal screen, on a larger screen, it is necessary to perform an image processing operation for digitally enlarging the size of the image. For example, a DMB terminal user may also want to overcome the limitation in the screen size of the terminal and enjoy a more vivid image through a large size of an external display unit. That is, in order to output an image of a Quarter Video Graphics Array (QVGA) (320*240) size, which is being currently provided by a DMB terminal, to a large size of an external display unit, image enlargement is necessary.

Figure 1:
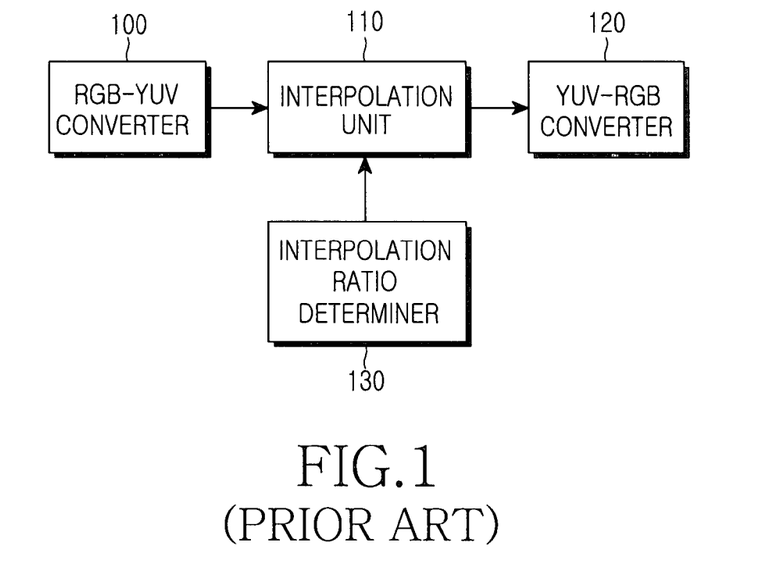
FIG. 1 illustrating the general construction of a system for performing interpolation.

For such image enlargement, there exists a method for performing interpolation for the R, G, B signals of an image in consideration of the ratio of size of the original image and the image to be enlarged. This will be described with reference to FIG. 1 illustrating the general construction of a system for performing interpolation. R, G, B signals are converted to YUV signals by an RGB-YUV converter 100. Then, an interpolation unit 110 performs interpolation for an entire image, which is input through the RGB-YUV converter 100, by means of an equal interpolation ratio determined by an interpolation ratio determiner 130. The interpolated image is converted to R, G, B signals again by a YUV-RGB converter 120. Herein, when the interpolation is performed in order to digitally enlarge the size of the image, it is an important key point in image enlargement to maintain the degree of definition of an edge in fields, in which edge information is important, such as graphics and texts.

Generally, in relation to R, G, B signals, since respective signals give the same effect in color expression, it is necessary to perform the same interpolation process for respective signal components in order to minimize the deterioration of picture quality. However, when the same interpolation is performed for an entire image as illustrated in FIG. 1, the deterioration of performance for high frequency signals may prominently occur. Herein, the R, G, B signals represent the three primary colors (red, green and blue) of light which an image display unit, such as a Cathode Ray Tube (CRT) and a Liquid Crystal Display (LCD), separates and outputs color tone signals through an RGB format in generating a color tone or an image. The RGB format requires three color tone separation materials at a minimum in order to express a color tone and requires a large memory capacity, but the separation and transmission effect of a color tone is excellent because an expression scheme used by image display units is employed. Further, in a YUV format, the separation and transmission effect of a color tone is weak as compared to the RGB format, but many more color tones can be expressed by means of small pieces of color tone information. In the YUV format, image signals are divided into luminance signals Y and color tone signals U and V, which represent horizontal and vertical synchronization signals, and are then processed.

In addition to the interpolation process as described above, according to another method for minimizing the deterioration of picture quality, R, G, B signals are converted to YUV signals and the respective signals are processed. Since each of the YUV signals has an independent characteristic, in contrast with the R, G, B signals, they do not have influence on one another. However, when expressing an image, the Y component gives more influence. Accordingly, the Y component is weighted or many more bits are assigned to the Y component, so that an enlarged image of high picture quality can be obtained through reduction of an operation amount or by means of a small memory.

However, when an image has been enlarged, the deterioration of picture quality prominently occurs in a high frequency area, as compared to a low frequency area. For example, since continuity of change in brightness within an image block is maintained but difference in brightness suddenly occurs in a boundary area of blocks, lattice noise may occur. That is, when interpolation for image enlargement is performed for a portion having a great brightness difference between adjacent pixels, the deterioration of picture quality prominently occurs, as compared to a portion having small brightness difference between the adjacent pixels. Further, when enlarging an image, a higher order interpolation method using linear interpolation or spline may be used. When interpolation is performed with no consideration of the frequency components of an image, the deterioration of picture quality may occur when enlarging the image.

In a case in which an image is enlarged by the conventional method as described above, if an image of high picture quality is input, the image is distorted because the original information of the image is not conserved in complicated edge portions having high frequency components. Therefore, the quality of the image may deteriorate.

SUMMARY OF THE INVENTION

Accordingly, the present invention has been made to solve at least the above-mentioned problems occurring in the prior art, and an object of the present invention is to provide a method and an apparatus for efficiently enlarging an image by using edge signal components while ensuring picture quality in a high frequency area.

In order to accomplish the aforementioned object, according to one aspect of the present invention, there is provided a method for efficiently enlarging an image by using edge signal components, the method including detecting edge signals of an image by means of outermost DCT components from a DC value on a two-dimensional coordinate system; generating a binary edge mask by means of the detected edge signals, the binary edge mask indicating distribution of high frequency components within the image; determining an order of a low pass filter based on the generated binary edge mask; and performing interpolation according to the determined filter order.

In order to accomplish the aforementioned object, according to further aspect of the present invention, there is provided an apparatus for efficiently enlarging an image by using edge signal components, the apparatus including an edge mask generator for detecting edge signals of an image by means of outermost DCT components from a DC value on a two-dimensional coordinate system, and generating a binary edge mask by means of the detected edge signals, the binary edge mask indicating distribution of high frequency components within the image; a filter order determiner for determining an order of a low pass filter based on the generated binary edge mask; and an interpolation unit for performing interpolation according to the determined filter order.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description, a detailed description of known functions and configurations incorporated herein will be omitted when it may obscure the subject matter of the present invention.

The present invention enables efficiently enlarging an image. The present invention detects image edge signals from two-dimensional Discrete Cosine Transform (DCT) components. Specifically, in the present invention, the outermost DCT components from a DC value are regarded as high frequency components in DCT components expressed in one two-dimensional coordinate system, the edge signals of an image are restored by means of only the high frequency components, and then a binary edge mask, which represents the distribution of high frequency components within the image, is generated from the restored edge signals. Accordingly, the present invention can determine an interpolation order based on the binary edge mask and perform interpolation. That is, a higher order low pass filter is applied to an area having many high frequency signal components, so that it is possible to output more precisely enlarged image signals. In this way, the present invention can not only improve the overall picture quality of an enlarged image, but can also properly adjust the amount of calculation and buffer capacity, which are used when interpolation is performed.

Herein, image signals transmitted after being compressed based on a DCT are used. Before describing the present invention, DCT-based image signals used in the present invention will be briefly described.

A DCT used when compressing an image is used for compressing a still image. The DCT is performed for an input image in a horizontal direction, is performed again for the input image in a vertical direction, and thus the input image is expressed on a two-dimensional coordinate system. This will be referred to as a two-dimensional DCT. Further, Moving Picture Experts Group (MPEG) series, an H.262 and an H.263 perform an 8 by 8 DCT, and an H.264 performs a 4 by 4 DCT, so that it is possible to compress and transmit DCT-based image signals. Since the transmitted bit stream includes signals encoded by the DCT, a receiver decodes the received compression signals and thus obtains the original image signals.

Generally, an image may consecutively have the same color as background including building walls and the color of the sky. When a DCT is performed for such image signals, most signals are output in a frequency of zero. For example, if a DCT is performed for an image area having the same color from a zero position to a one hundred position, the same one hundred values are output. Herein, a value of a zero frequency is first output, and high frequency signals are output as time goes by. Since the area has the same color, these signals represent DC components and have only components of a zero frequency. When interpolation for image enlargement is performed for a portion from which such high frequency signals are output, picture quality may deteriorate. In order to solve the problem, a method for enlarging an image while ensuring high picture quality is provided.

The present invention uses the fact that high frequency components are output as it goes away from a DC value on a two-dimensional DCT coordinate system. Specifically, in the present invention, the outermost DCT components from the DC value on the two-dimensional coordinate system are regarded as high frequency components.

Accordingly, a process is provided that allows the high frequency components, which are the outermost DCT components, to maintain high picture quality even when an image is enlarged.

Figure 2:
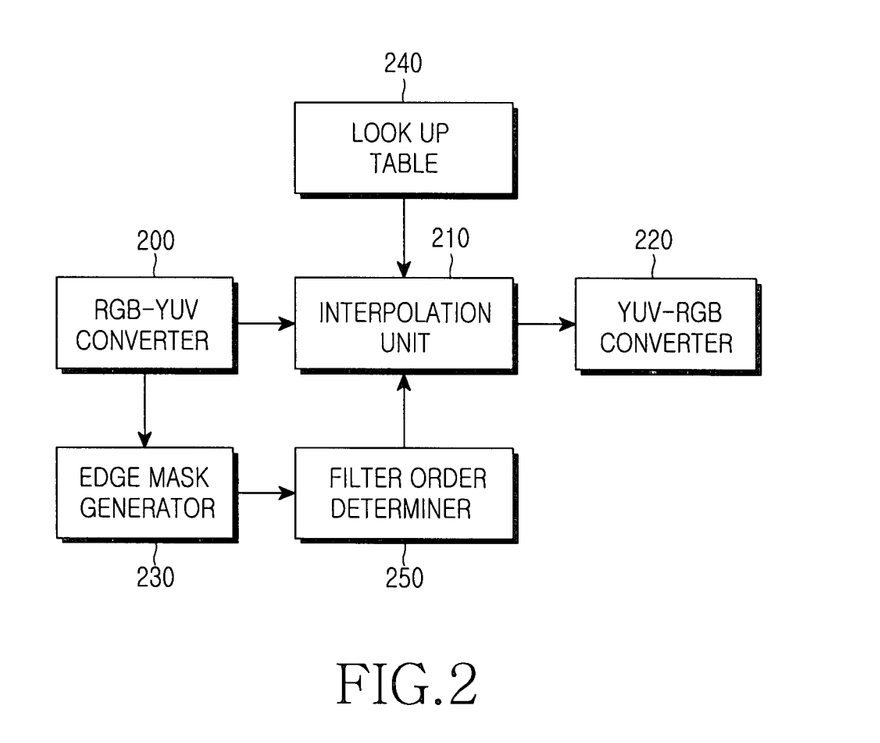
FIG. 2 is a block diagram illustrating an image enlargement apparatus according to the present invention.

The construction of an image enlargement apparatus for efficiently enlarging an image by using edge signal components according to the present invention will be described with reference to FIG. 2.

The image enlargement apparatus includes an RGB-YUV converter 200, an interpolation unit 210, a YUV-RGB converter 220, an edge mask generator 230, a filter order determiner 250 and a look up table 240.

The RGB-YUV converter 200 typically converts R, G, B signals of an input image to Y, U, V signals, i.e. Y, Cr, Cb signals.

Almost all graphic cards basically use a YUV method when processing data. Generally, a video decoder, which conforms to a video compression standard such as MPEG series, an H.261, an H.263 and an H.264, etc., uses a YUV output format. Accordingly, digital video products convert a color model to RGB pixel data in order to display YUV pixel data, which are output from a camera or a video decoder, through a CRT or an LCD. To this end, the YUV-RGB converter 220 converts a YUV image to an RGB image again.

In order to obtain binary image edge signals from the input image through the RGB-YUV converter 200, a general sobel operator may also be used. However, this uses an additional operation and memory buffer. Accordingly, the present invention discloses a method for acquiring image edge signals from encoded and transmitted DCT signals.

Figure 3:
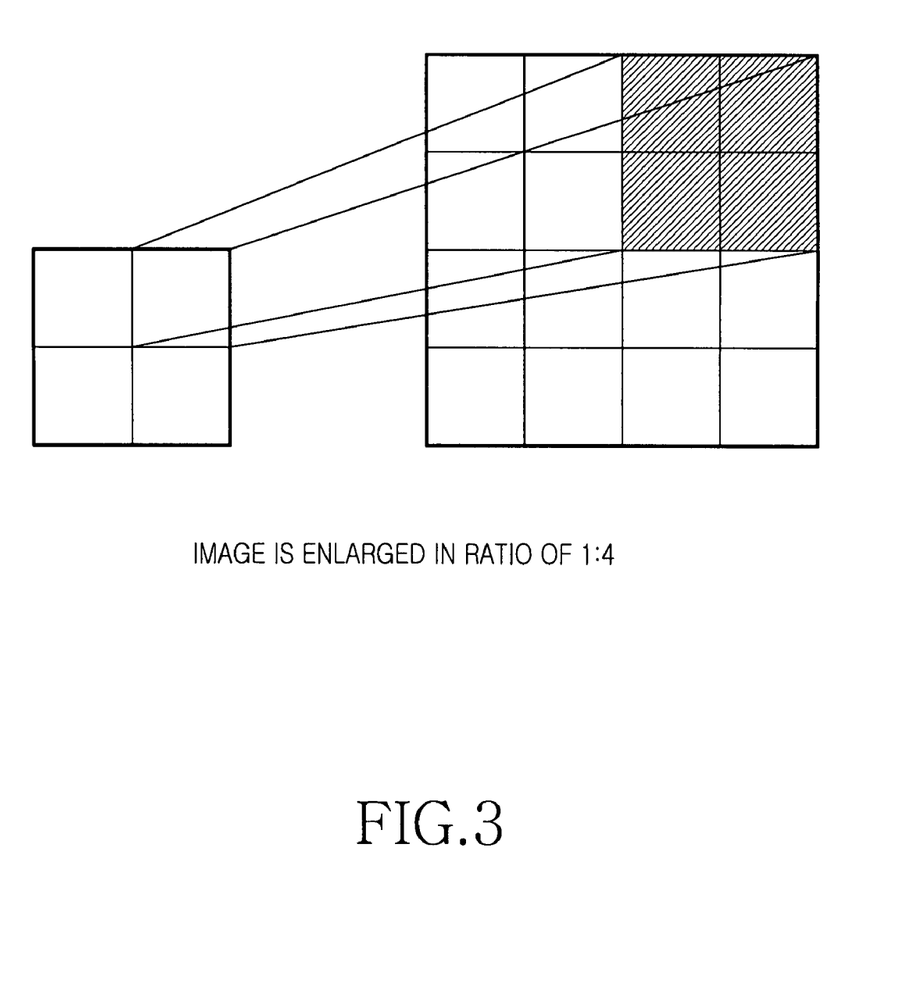
FIG. 3 is a block diagram illustrating image enlargement in the ratio of 1:4 according to the present invention.

In a case in which an image is enlarged in the ratio of 1:4 as illustrated in FIG. 3, when interpolation for image enlargement is performed for a portion having a substantial difference between adjacent pixels, the deterioration of picture quality occurs because one block is enlarged to four blocks, as compared to a portion having almost no difference between the adjacent pixels. Accordingly, in the present invention, the same order interpolation is performed for a low frequency area having almost no difference between the adjacent pixels with respect to an entire image, and a higher order interpolation is performed for a high frequency area having a substantial difference between the adjacent pixels. Hereinafter, in the present invention, an example of enlarging an image of a QVGA (320*240) size to an image of a VGA (640*480) size will be described for convenience of description.

According to the present invention, a process is performed for finding a high frequency area from an image input through the RGB-YUV converter 200, and a higher order interpolation is performed for the high frequency area. To this end, the image enlargement apparatus according to the present invention further includes the edge mask generator 230, the filter order determiner 250 and the look up table 240, in addition to the RGB-YUV converter 200, the interpolation unit 210 and the YUV-RGB converter 220.

Hereinafter, the operation of the edge mask generator 230 according to the present invention will be described with reference to FIG. 4, that shows an image, for which a DCT has been performed, on an 8*8 block.

Figure 4:
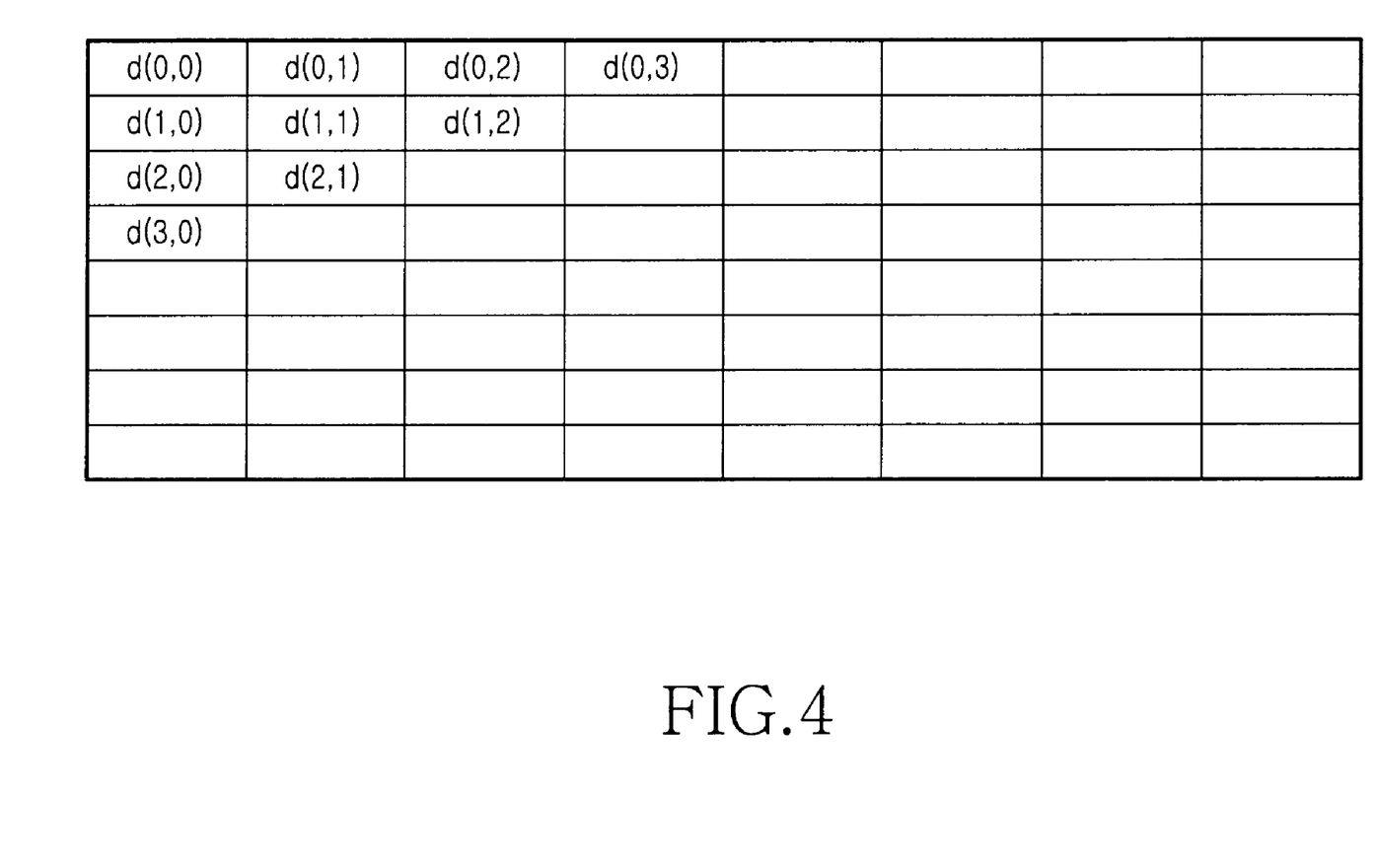
FIG. 4 is a diagram illustrating an image, for which a DCT has been performed, on an 8*8 block according to the present invention.
Figure 5:
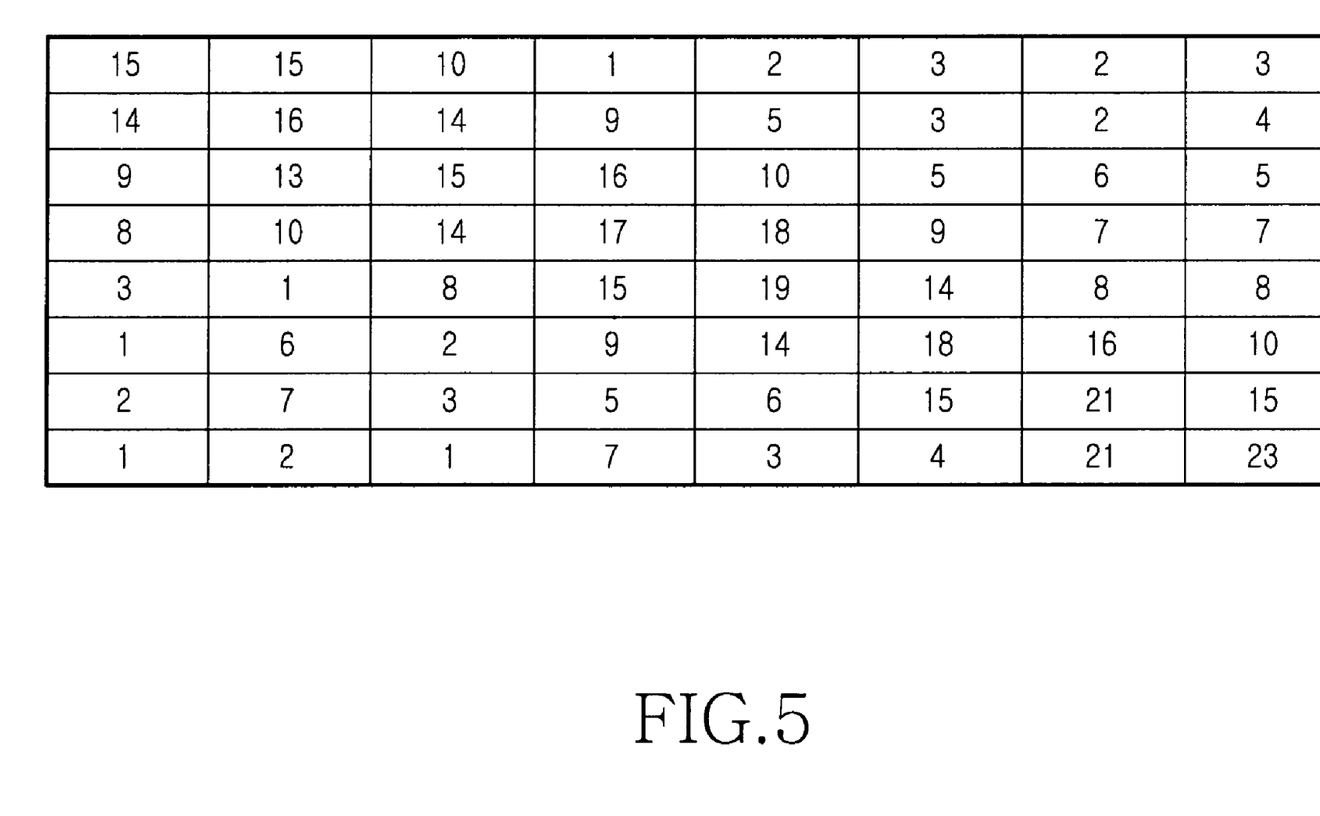
FIG. 5 is a concept diagram of a gray level for a restored edge image according to the present invention.

Referring to FIG. 4, d (0, 0) represents DC components of an image, and corresponds to a DC value in a two-dimensional coordinate system. The further away from d (0, 0), which is the DC value, high frequency components of the image appear. Edge signals of the image are restored by means of only the outermost DCT components d (0, 3), d (2, 1), d (1, 1) and d (0, 2). The edge signals restored by means of only the outermost DCT components may be expressed by an 8*8 block as illustrated in FIG. 5, showing a diagram of a gray level for a restored edge image. The binary edge mask may be obtained from the diagram of FIG. 5 through Equation 1.

$$b(i, j) = \begin{pmatrix} 1 & \text{if } s(i, j) \geq d(0, 0) \\ 0 & \text{else} \end{pmatrix}$$

In Equation 1, b (i, j) represents a binary edge mask located in an $i^{th}$ row and $j^{th}$ column within the 8*8 image block. If b (i, j)=1, it indicates that edge signal components exist in a corresponding position. A threshold value used for determining existence or absence of edge signals employs d (0, 0) on a two-dimensional coordinate, which represents the DC value of the 8*8 block, as a reference. That is, when an edge signal value located in an $i^{th}$ row and $j^{th}$ column is greater than d (0, 0), it corresponds to a boundary portion or a portion in which a color changes. Accordingly, this portion is regarded as a high frequency area.

Figure 6:
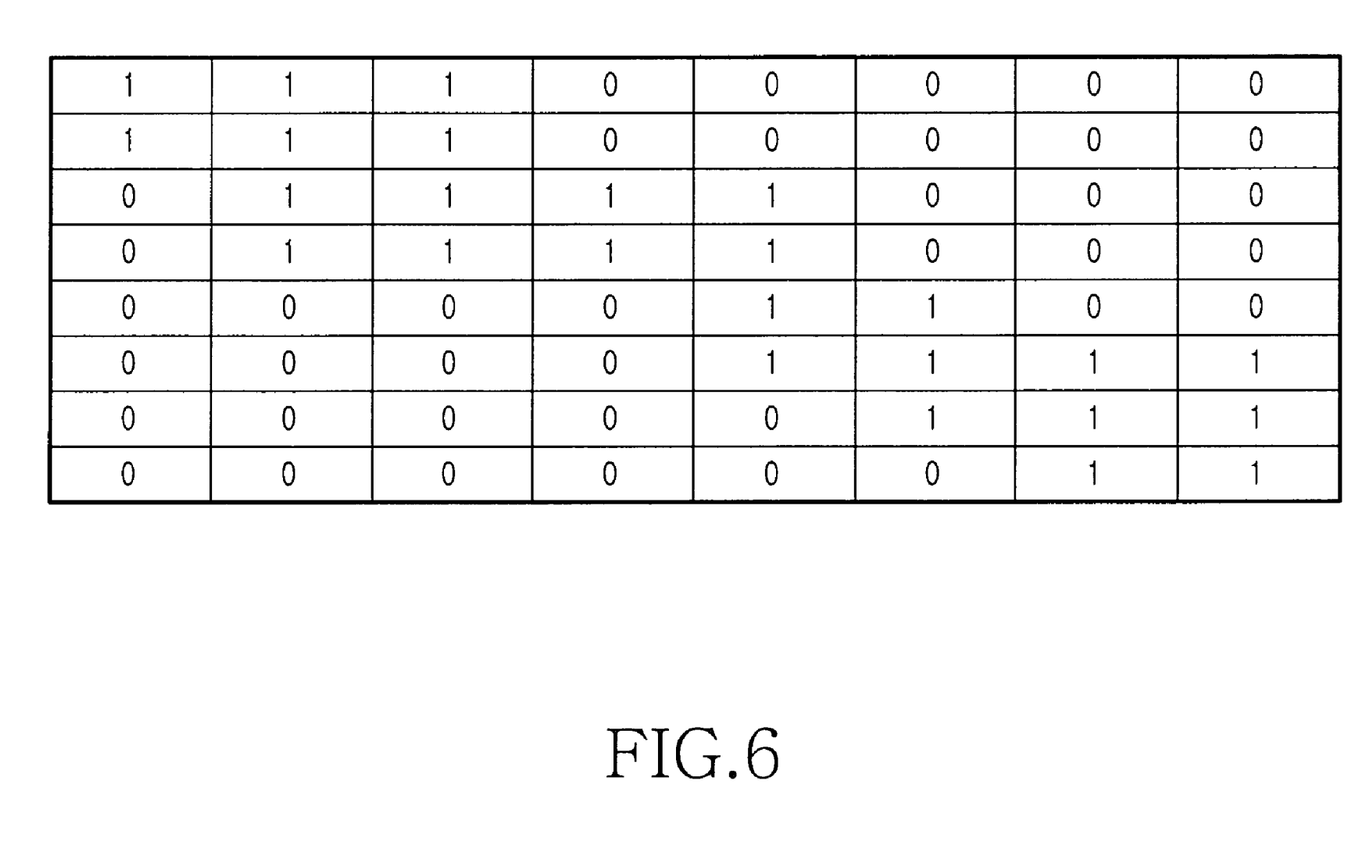
FIG. 6 is a concept diagram in which a binary edge mask is expressed by an 8*8 block according to the present invention.

The binary edge mask obtained through Equation 1 as described above may be expressed by the blocks shown in FIG. 6.

As described above, the edge mask generator 230 detects edge signals by means of only the high frequency components, and generates the binary edge mask as illustrated in FIG. 6 based on the detected edge signals.

Then, the filter order determiner 250 determines a filter order based on the generated binary edge mask. When the binary edge mask of a corresponding block has a value of zero, the image signals of the block correspond to low frequency components. Accordingly, the filter order determiner 250 determines a filter order as a first order because it is possible to maintain high picture quality by simply performing a first order linear interpolation in a column direction and a row direction. However, when the binary edge mask of a corresponding block has a value of one, the image signals of the block correspond to high frequency components. Accordingly, the filter order determiner 250 determines a filter order as a higher order so that precise interpolation can be performed because a boundary portion may be damaged in image enlargement using the first order linear interpolation.

The filter order determiner 250 consecutively counts an area, in which a mask value of a corresponding block position is one, right and left through a line search in each row, and uses a value obtained through the counting as the order of a low pass filter, which is to be applied in interpolation. That is, the filter order determiner 250 counts the number of times by which a block area having a binary edge mask value of one consecutively appears. If the order of the low pass filter is determined through the process described above, the determined filter order is provided to the interpolation unit 210.

Then, when the determined filter order is a first order, the interpolation unit 210 performs the first order linear interpolation. The pixel value of a corresponding block is repeatedly applied to a position according to image enlargement, so that sufficient picture quality can also be obtained. In such a case, it is possible to greatly reduce both the amount of calculation and buffer capacity needed for interpolation. However, if an order determined based on the value counted by the filter order determiner 250 is provided, the interpolation unit 210 acquires a filter coefficient of the determined order with reference to the look up table 240, and performs higher order interpolation. The interpolation unit 210 performs interpolation for a block area having many high frequency components by means of a higher order low pass filter, so that the present invention can obtain image signals capable of precisely maintaining high picture quality even when an image is enlarged.

Figure 7:
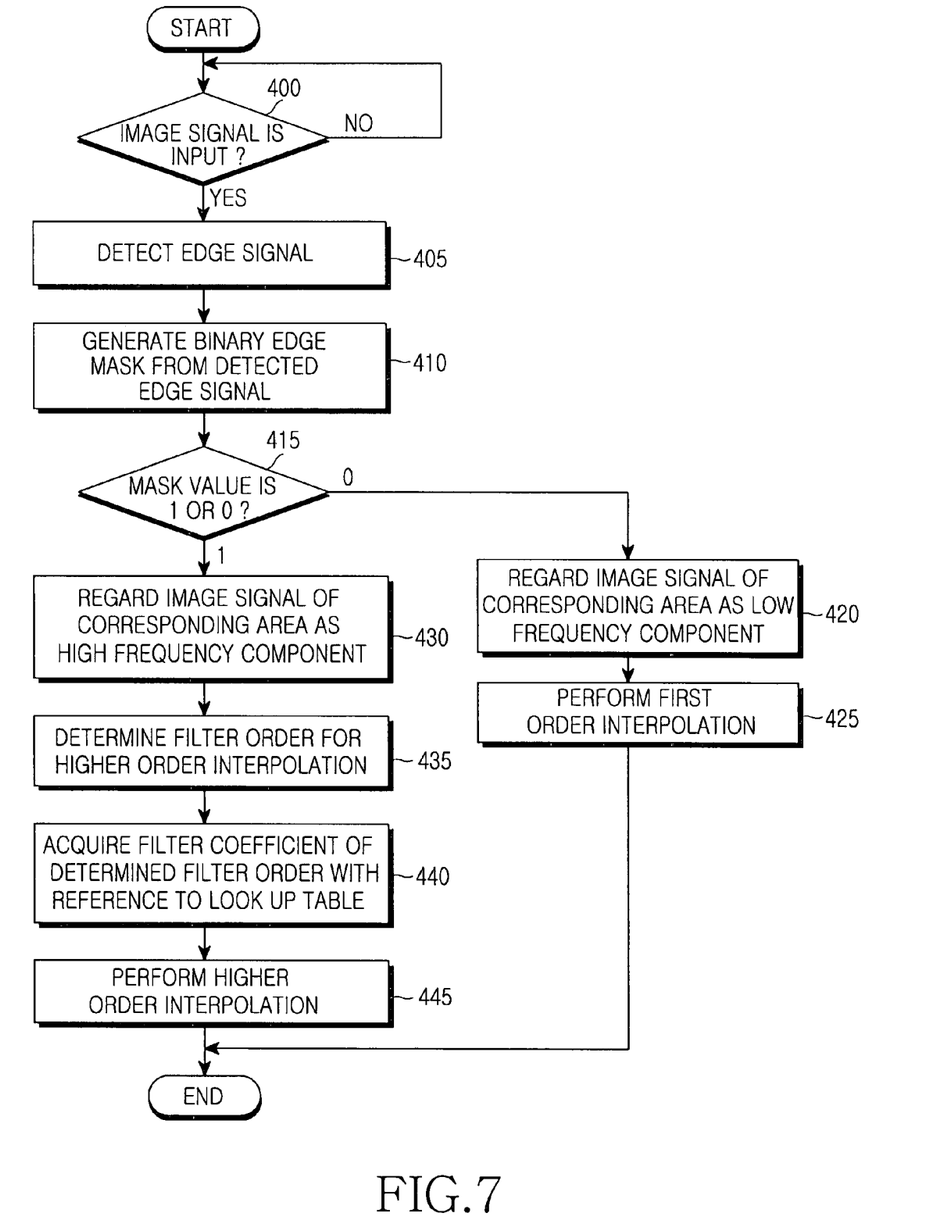
FIG. 7 is a flow diagram illustrating an image enlargement process according to the present invention.

An image enlargement process in which the image enlargement apparatus having the construction as described above ensures picture quality in a high frequency area will be described with reference to FIG. 7, that shows a flow diagram illustrating the image enlargement process according to the present invention.

In step 400, the image enlargement apparatus determines if image signals are input. The input image signals represent encoded and transmitted DCT signals. If the image signals are input, the image enlargement apparatus detects edge signals by means of only the outermost DCT components from a DC value on a two-dimensional coordinate system in step 405, and generates a binary edge mask by means of the detected edge signals in step 410. The image enlargement apparatus restores the edge signals of the image by means of only the outermost DCT components from the DC value on the two-dimensional coordinate system, and generates the binary edge mask by applying Equation 1 to the restored edge signals.

In step 415, the image enlargement apparatus determines if a mask value is one or zero. If the mask value is zero, step 420 is performed, where the image enlargement apparatus regards the image signals of a corresponding area as low frequency components. In step 425, the image enlargement apparatus performs first order interpolation. However, if the mask value is one, step 430 is performed, where the image enlargement apparatus regards the image signals of a corresponding area as high frequency components. In step 435, the image enlargement apparatus determines a filter order for higher order interpolation. The filter order is determined by a value obtained by consecutively counting an area, in which a mask value of a corresponding position is one, right and left through a line search in each row. The present invention performs interpolation for an area having many high frequency components by means of many more low pass filters, thereby enabling precise image enlargement to be accomplished.

In this way, if the filter order for higher order interpolation is determined, the image enlargement apparatus acquires a filter coefficient of the determined filter order with reference to the look up table in step 440, and performs higher order interpolation in step 445.

According to the present invention as described above, more precise interpolation is performed for a high frequency area, so that it is possible to improve the overall picture quality of an enlarged image, and to properly adjust the amount of calculation and buffer capacity, which are used when interpolation is performed.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for efficiently enlarging an image by using edge signal components, the method comprising:
    detecting edge signals of an image by means of outermost Discrete Cosine Transform (DCT) components from a DC value on a two-dimensional coordinate system;
    generating a binary edge mask by means of the detected edge signals, the binary edge mask indicating a distribution of high frequency components within the image;
    determining an order of a low pass filter based on the generated binary edge mask; and
    performing interpolation according to the determined filter order,
    wherein the binary edge mask is generated according to $$b(i, j) = \begin{pmatrix} 1 & \text{if } s(i, j) \geq d(0, 0) \\ 0 & \text{else} \end{pmatrix},$$

where $s(i,j)$ represents an edge detected signal, $b(i,j)$ represents the binary edge mask located in an $i^{th}$ row and $j^{th}$ column within an 8*8 image block, and a threshold value employs $d(0, 0)$ as a reference on the two-dimensional coordinate, which represents a DC value of the 8*8 image block.

2. The method as claimed in claim 1, wherein, in the step of performing the interpolation, a filter coefficient of the determined filter order is acquired with reference to a look up table for storing a coefficient of the low pass filter, and the interpolation is performed.

3. A method for efficiently enlarging an image by using edge signal components, the method comprising:
    detecting edge signals of an image by means of outermost Discrete Cosine Transform (DCT) components from a DC value on a two-dimensional coordinate system;
    generating a binary edge mask by means of the detected edge signals, the binary edge mask indicating a distribution of high frequency components within the image;
    determining an order of a low pass filter based on the generated binary edge mask; and
    performing interpolation according to the determined filter order;
    checking a value of the generated binary edge mask in each block area of the image;
    when the binary edge mask has a value of zero, regarding image signals of the block area as low frequency components, and determining the order of the low pass filter as a first order;
    regarding image signals of the block area as high frequency components and performing a line search in each row when the binary edge mask has a value of one;
    counting a number of times a block area having the binary edge mask value of one consecutively appears; and
    setting the filter order for the interpolation based on the number.

4. An apparatus for efficiently enlarging an image by using edge signal components, the apparatus comprising:
    an edge mask generator for detecting edge signals of an image by means of outermost Discrete Cosine Transform (DCT) components from a DC value on a two-dimensional coordinate system, and generating a binary edge mask by means of the detected edge signals, the binary edge mask indicating distribution of high frequency components within the image;
    a filter order determiner for determining an order of a low pass filter based on the generated binary edge mask; and
    an interpolation unit for performing interpolation according to the determined filter order,
    wherein the edge mask generator generates the binary edge mask according to $$b(i, j) = \begin{pmatrix} 1 & \text{if } s(i, j) \geq d(0, 0) \\ 0 & \text{else} \end{pmatrix},$$

where $s(i,j)$ represents an edge detected signal, $b(i,j)$ represents the binary edge mask located in an $i^{th}$ row and $j^{th}$ column within an 8*8 image block, and a threshold value employs $d(0, 0)$ as a reference on the two-dimensional coordinate, which represents a DC value of the 8*8 image block.

5. The apparatus as claimed in claim 4, wherein the interpolation unit acquires a filter coefficient of the determined filter order with reference to a look up table for storing a coefficient of the low pass filter, and performs the interpolation.

6. An apparatus for efficiently enlarging an image by using edge signal components, the apparatus comprising:
    an edge mask generator for detecting edge signals of an image by means of outermost Discrete Cosine Transform (DCT) components from a DC value on a two-dimensional coordinate system, and generating a binary edge mask by means of the detected edge signals, the binary edge mask indicating distribution of high frequency components within the image;
    a filter order determiner for determining an order of a low pass filter based on the generated binary edge mask; and
    an interpolation unit for performing interpolation according to the determined filter order,
    wherein the filter order determiner checks a value of the generated binary edge mask in each block area of the image, and regards image signals of the block area as low frequency components, and determines the order of the low pass filter for the interpolation as a first order when the binary edge mask has a value of zero, and
    wherein the filter order determiner regards image signals of the block area as high frequency components when the binary edge mask has a value of one, performs a line search in each row, counts a number of times a block area having the binary edge mask value of one consecutively appears, and sets the filter order for the interpolation based on the number.

* * * * *